No. 875,237. PATENTED DEC. 31, 1907.
J. G. BLESSING.
CUTLERY GLAZING MACHINE.
APPLICATION FILED OCT. 15, 1906.

5 SHEETS—SHEET 2.

Witnesses:
Inventor:
John G. Blessing,
By Dyrenforth, Dyrenforth, Lee and Wiles,
Attys.

No. 875,237. PATENTED DEC. 31, 1907.
J. G. BLESSING.
CUTLERY GLAZING MACHINE.
APPLICATION FILED OCT. 15, 1906.

5 SHEETS—SHEET 3.

Witnesses:
Inventor:
John G. Blessing,

No. 875,237.

PATENTED DEC. 31, 1907.

J. G. BLESSING.
CUTLERY GLAZING MACHINE.
APPLICATION FILED OCT. 15, 1906.

5 SHEETS—SHEET 4.

Witnesses:

Inventor:
John G. Blessing,

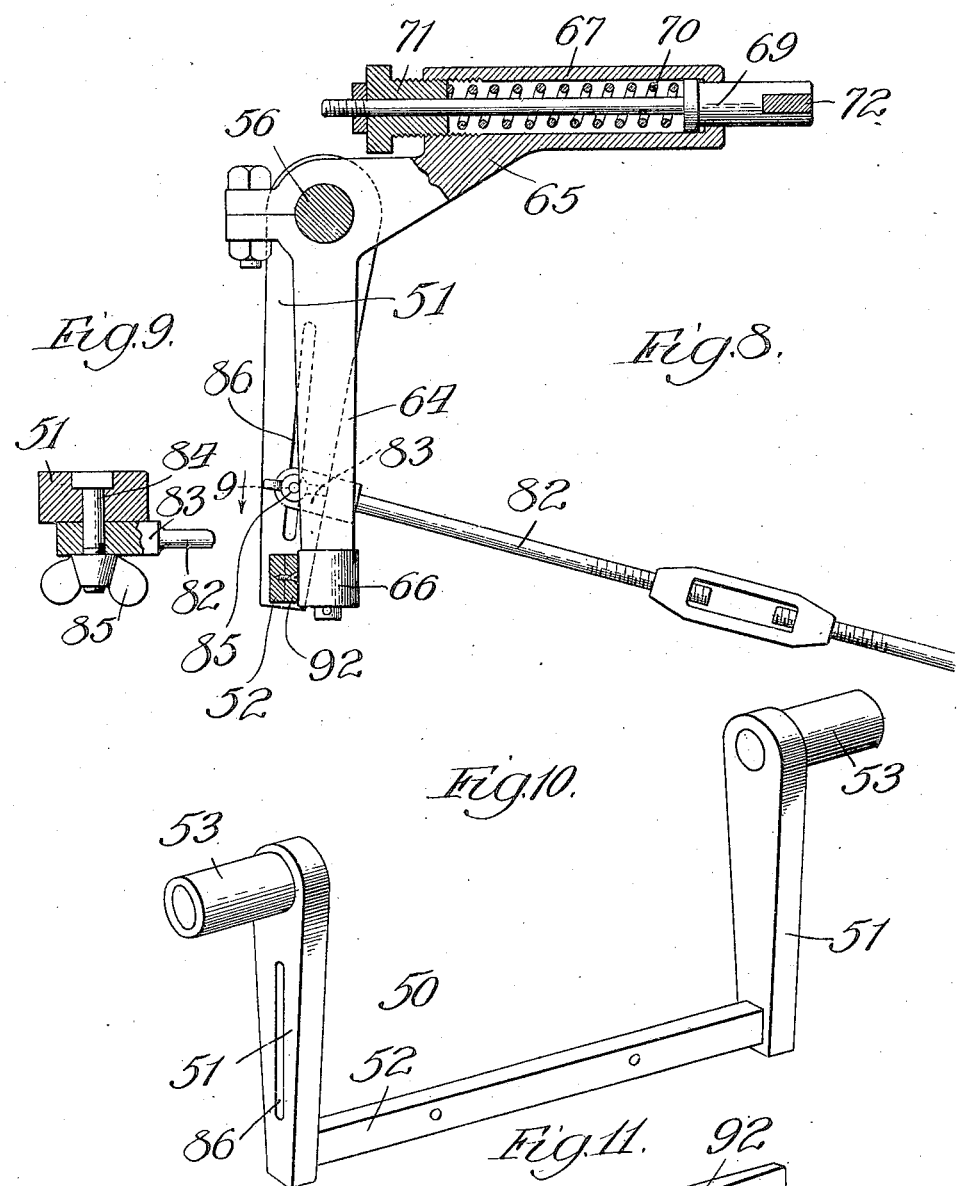

UNITED STATES PATENT OFFICE.

JOHN G. BLESSING, OF CHICAGO, ILLINOIS, ASSIGNOR TO AMERICAN CUTLERY COMPANY, A CORPORATION OF ILLINOIS.

CUTLERY-GLAZING MACHINE.

No. 875,237.

Specification of Letters Patent.

Patented Dec. 31, 1907.

Application filed October 15, 1906. Serial No. 338,933.

*To all whom it may concern:*

Be it known that I, JOHN G. BLESSING, a citizen of the United States, residing at Chicago, in the county of Cook and State of Illinois, have invented a new and useful Improvement in Cutlery-Glazing Machines, of which the following is a specification.

My invention relates to improvement in the construction of machines for grinding, polishing or glazing articles generally and cutlery blades in particular, and of the class in which a work-holder is reciprocated horizontally across a rotary abrading or polishing wheel the full length of the surface to be polished and is given a rocking, usually down and up, movement in a manner to cause the work to be raised and lowered, by intermittent steps, whereby the surface will be acted upon throughout in a single rocking, or down and up, movement of the holder.

My object is, generally stated, to provide an improved, simplified and highly efficient machine for grinding articles, or, and more especially, for glazing cutlery blades, or the like, and which shall be readily adjustable to adapt it to work with equal economy upon articles or blades of different lengths, widths and shapes. To this end I provide improved means for properly regulating the distance of reciprocation of the work-holder; improvements for regulating the rocking movement of the work-holder; improved means for causing blades, or the like, of curved or irregular shape to be acted upon with equal pressure against the abrading or polishing wheel throughout the operation; and other improvements in details of construction, all of which contribute toward rendering the machine especially desirable for its purpose.

Figure 1:
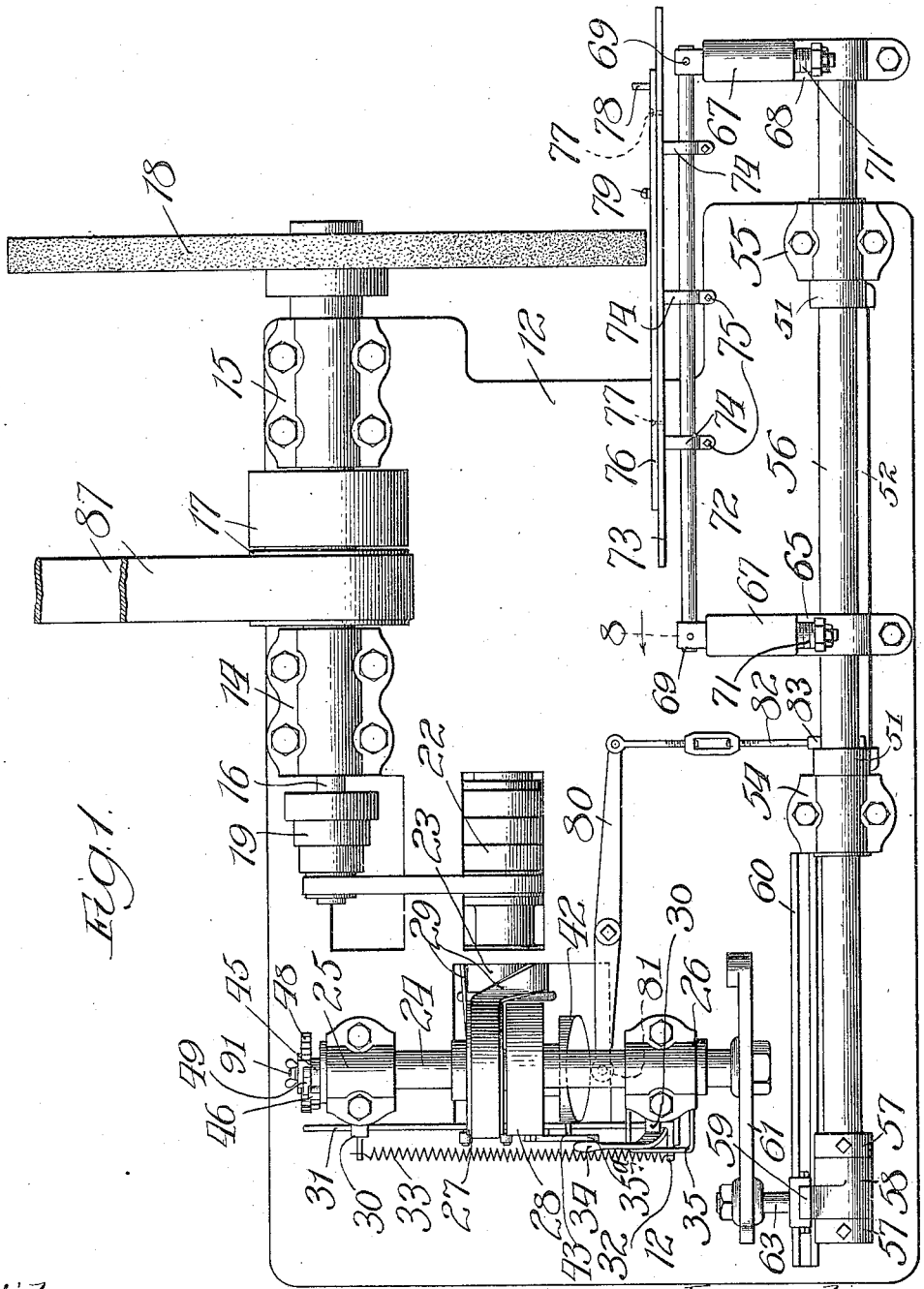
Figure 2:
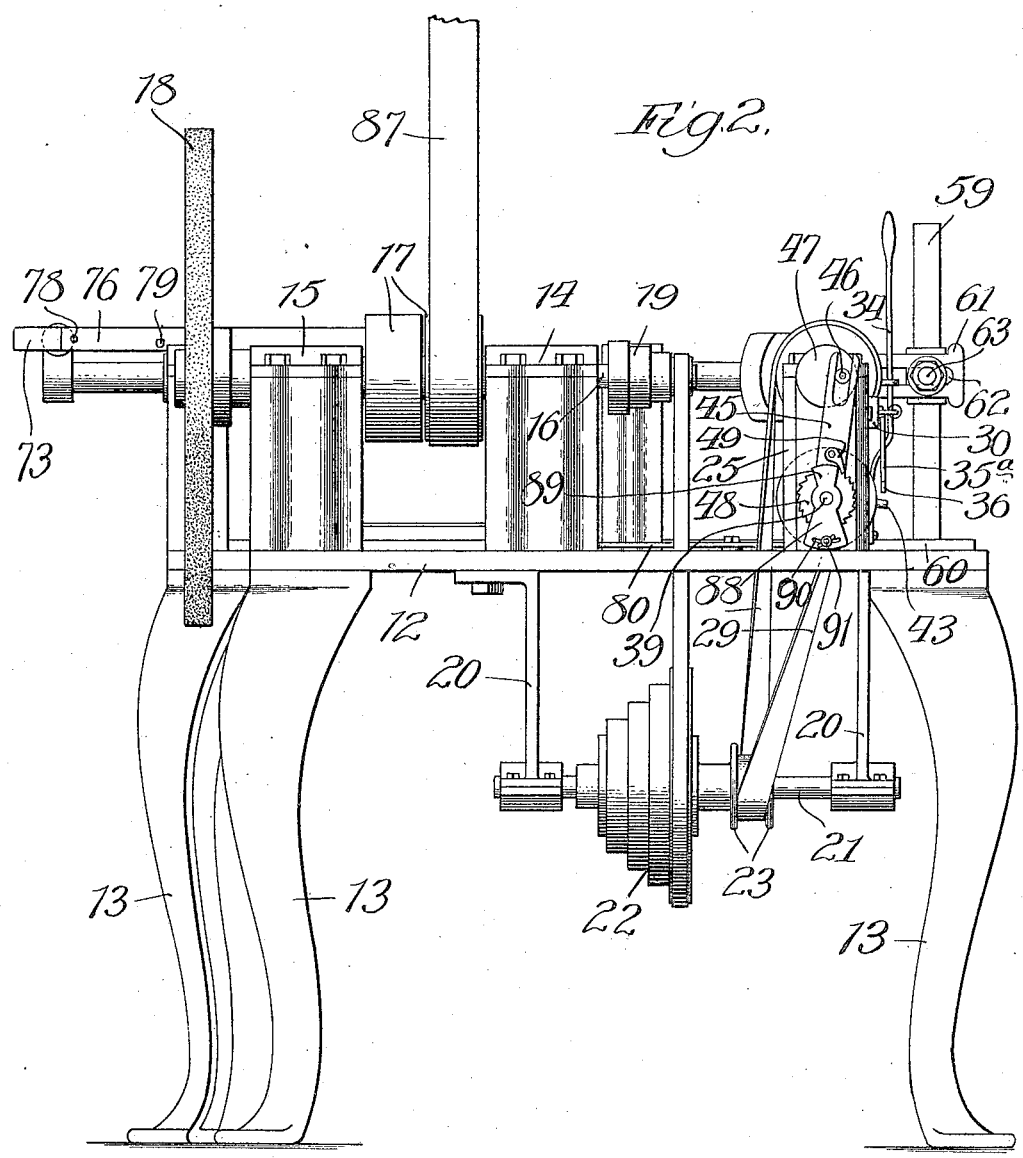
Figure 3:
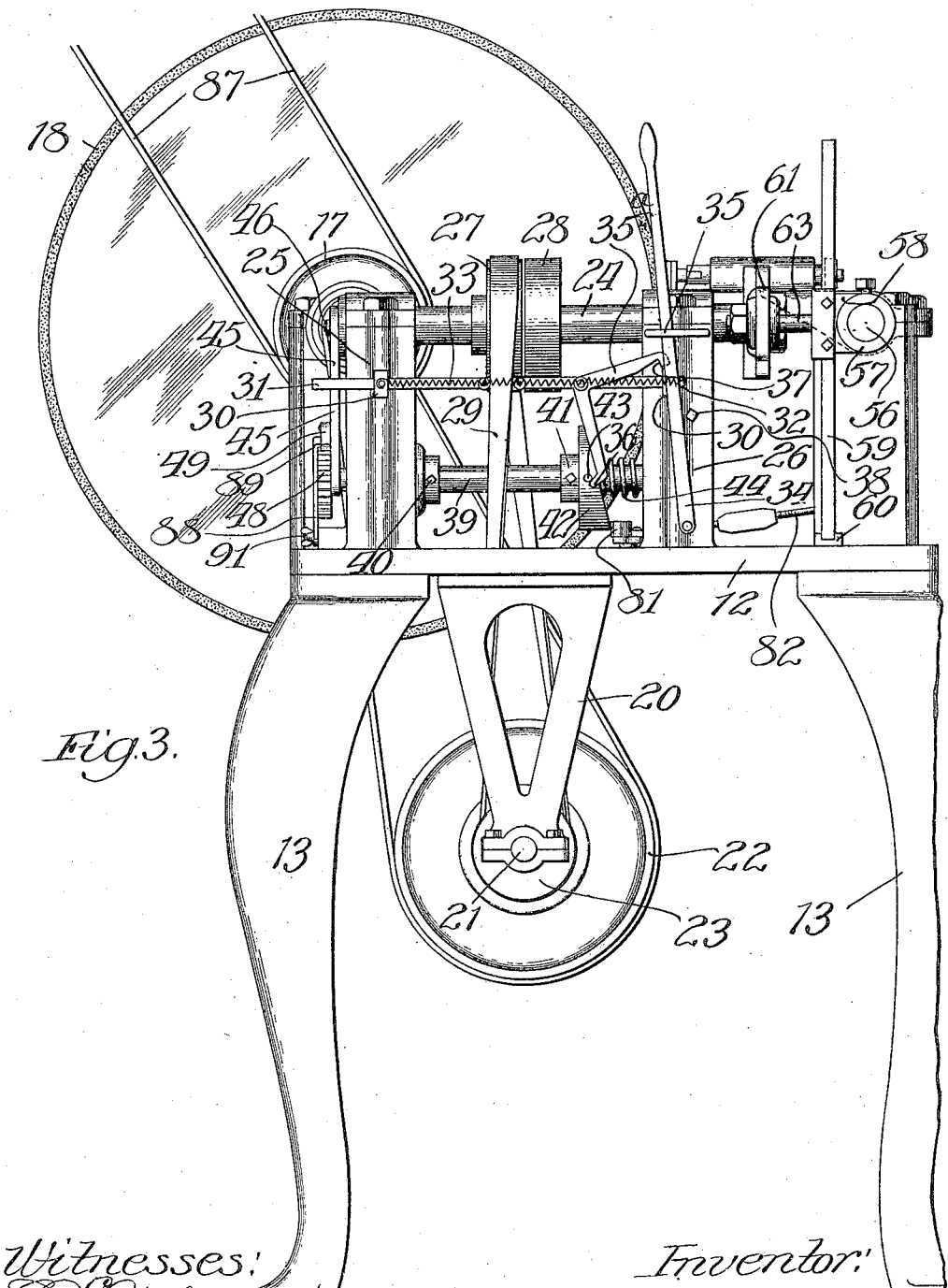

Referring to the drawings—Figure 1 is a top plan view of a cutlery-glazing machine constructed with my improvements; Fig. 2, a rear elevation; Fig. 3, an end view; Figs. 4, 5, 6 and 7, enlarged fragmentary views illustrating the means for regulating the down and up movement of the work-holder and illustrating the various adjustments and mode of operation; Fig. 8, an enlarged broken, partly sectional view of details of construction of the work-holder, the section being taken on line 8 in Fig. 1; Fig. 9, an enlarged broken section taken on line 9 in Fig. 8; Fig. 10, a rocking-frame forming one of the details of construction of the work-holder carrier; and Fig. 11, an adjustable and removable face-plate or shoe for the carrier of a form which adapts the machine for polishing knife-blades of one usual shape.

12 is a stationary bed-plate mounted upon legs 13 and forming the main frame of the machine. Rising from the bed plate in the position shown are standards 14, 15, forming bearings for a main drive-shaft 16 carrying fast and loose drive-pulleys 17, a polishing or abrading wheel 18 at one end and a step or cone pulley 19 at its opposite end. Fastened against the under side of the bed-plate in the position shown are hangers 20 forming bearings for a counter-shaft 21 carrying a step or cone pulley 22 and a pulley 23.

24 is a shaft journaled in the standards 25 and 26 on the base-plate 12. Between the standards the shaft 24 carries a loose pulley 27 and a fast pulley 28 driven by a belt 29 from the pulley 23. Sliding longitudinally in bearing lugs 30, 30, on the standards 25, 26 is a belt-shifting bar 31 provided at its end adjacent to the standard 26 with an offset 32. Fastened at one end to the lug 30 on the standard 25 and at its opposite end to the offset 32 is a spring 33 which tends normally to draw the belt-shifter in the direction to the left in Fig. 3 and shift the belt 29 to the loose pulley 27. Pivoted at its lower end to the standard 26 is a lever or handle 34 engaging the offset 32 and movable in a stirrup-guide 35 on said standard. A bell-crank lever 35ª is pivoted between its ends on the belt-shifting bar described and is provided at the lower end of its downward-extending arm with a cam-face toe 36 and at the end of its other arm with a shoulder 37. As before stated the belt-shifting bar is held by its spring 33 in the position of shifting the belt 29 to the loose pulley 27, as shown in Fig. 3. Movement of the lever 34 to the right, in Fig. 3, draws the belt-shifting bar in the same direction to shift the belt to the fast pulley 28. When thus shifted the shoulder 37 of the bell-crank lever drops over and engages a pin or stud 38 on the standard 26, thereby holding the belt in engagement with the fast pulley 28.

Below and parallel with the shaft 24 is a shaft 39 journaled at one end in the standard 26 and passing through a bearing in the standard 25. The shaft carries a thrust-bearing collar 40, which rotates against the side of the standard 25, and also a collar 41. Integral with the collar 41 is a cam 42 provided at one side in the position shown with a projecting pin or lug 43. Surrounding the shaft 39 and bearing at opposite ends against the standard 26 and cam 42 is a spring 44 which operates to press the collar 40 against the face of the standard 25 to cause the shaft 39 to rotate against the desired frictional resistance. Pivoted upon the shaft 39 beyond the standard 25 is a lever 45 recessed in its upper end portion where it engages an eccentric pin or roller 46 carried by a disk 47 on the end of the shaft 24. The shaft 39 carries a ratchet-wheel 48 which is actuated to rotate the shaft by a pawl 49 carried by the lever 45.

50 is a stirrup-frame having side arms 51, 51 connected at the lower ends by a bar 52. At the upper ends of the arms 51 are sleeves 53, 53 journaled, respectively, in standards 54 and 55 on the base-plate 12. Extending through the sleeves 53 and slidably mounted therein is a reciprocating rock-shaft 56. Confined between collars 57, 57 on one end portion of the shaft 56 is a loose sleeve 58 on which is mounted a vertical bar 59. At its lower end the said bar reciprocates in a horizontally recessed guide-bar 60 mounted on the base-plate. The shaft 24 carries on its end a laterally-extending arm 61 having a longitudinally-extending slot 62 in which is adjustably mounted a block 63 slidably embracing the bar 59. In the rotation of the shaft 24 the arm 61 is swung around a circle in the vertical plane and the engagement of the block with the bar 59 causes the latter and the shaft 56 to be reciprocated.

The work-holder consists of one bell-crank shaped end portion consisting of a downward-extending arm 64 and a horizontally-extending arm 65, both secured to the reciprocating shaft 56. The arm 64 is provided at its lower end with a roller 66 and the arm 65 is formed with a hollow cylinder-portion 67. The arm 68 constructed like the arm 65 and having a similar cylinder-portion 67 is securely fastened to the end of the shaft 56 to extend parallel with the arm 65. In each of the cylinders 67 is a plunger 69 held normally in extended position by a stiff spring 70. The tension of the springs 70 may be increased or diminished by the turning of its plug 71 which surrounds the stem of the plunger and bears against the spring as shown in Fig. 8. The distance to which the plunger may extend beyond the end of the cylinder is regulated by a stop-nut adjustable along the plunger stem and which normally contacts with the outer end of the plug 71, as shown in Fig. 8. The heads of the plungers 69 are connected together by a bar 72. 73 is a work-holder carrier-plate provided on one side with split lugs 74 which receive the bar 72 and are clamped thereto by means of clamp-screws 75 to hold the plate 73 in adjusted position upon the bar 72. 76 is a removable and replaceable work carrier plate which may be fastened against the plate 73 by means of screws 77, as indicated, and which is provided with the usual pin 78 and hook 79 for holding a knife-blade, for example.

Fulcrumed between its ends on the base-plate 12 is a lever 80 provided at one end with a roller 81 bearing against the face of the cam 42 and pivotally connected at its opposite end to a rod 82. The rod is formed in two sections joined by a turn-buckle, as indicated, whereby it may be lengthened and shortened, and on the end of the rod opposite the lever 80 is a head 83 adjustably connected by means of a pin 84 and thumb-nut 85 to an elongated slot 86 in one arm 51 of the frame 50.

Normally when the machine is at rest the moving parts are in their relative positions indicated in Figs. 1, 2 and 3. The main drive-belt 87 rotates the shaft 16 and through it the polishing-wheel 18 and counter-shaft 21. Initially the work-holder is in the raised position indicated in Fig. 3 and before the operation is started a blade to be polished is placed therein in the usual way. To start the polishing operation the lever 34 is swung in the direction to the right in Fig. 3 to move the belt-shifting bar 31 and the belt 29 to the fast pulley 28. This starts the rotation of the shaft 24 and permits the bell-crank lever 35$^a$ to swing and engage the pin 38 to hold the belt upon the fast pulley against the resistance of the spring 33. In the rotation of the shaft 34 the shaft 56, work-holder carrier, work-holder and blade to be polished, are reciprocated by the arm 61 and attendant mechanism, as described, a complete reciprocation occurring in each rotation of the shaft 24. During the rotation of the shaft 24 the eccentric pin 46 on the disk 47 swings the lever 45 back and forth on its fulcrum to cause the pawl 49 to turn the ratchet 48 and shaft 39 intermittently. In the consequent intermittent rotation of the cam 42 the lever 80 bearing against the cam conveys a step-by-step, forward and backward movement to the arm 51 and through it a step-by-step rocking motion to the shaft 56, causing the work-holder to be lowered step by step, then raised step by step, until the cam and shaft 39 have completed one revolution. As they near the completion of one revolution the pin 43 on the cam engages the toe-portion of the bell-crank lever 35$^a$, with the result of raising the shoulder end-portion 37 out of engagement with the pin or shoulder 38, thereby releasing the belt-shifting bar and causing it to be moved with the handle 34 and shift the belt to the loose pulley 27, when the shaft 24 and parts operated thereby will stop. This stopping of the operation will occur when the work-carrier is in its raised position, permitting the polished blade to be readily removed and replaced with another.

It is desirable that the distance of reciprocation of the work-carrier shall not exceed the length of the surface of the blade, or the like, to be polished. The throw of the shaft 56 and work-carrier may be readily adjusted by adjusting the block 63 along the slot 62 in the arm 61, as will be readily understood. It is also necessary that the lines of engagement of the polishing wheel with the blade to be polished shall be so close together as to produce the desired high polish or glaze. In other words, while for a narrow knife-blade the polishing may be effected with, say, fifty reciprocations of the work-holder, a blade twice that width would require one hundred reciprocations during the down and up movement of the work-carrier. To accomplish this it is necessary to regulate the speed of reciprocation of the carrier and the distance of angular movement of the shaft 39 in each rotation of the shaft 24. For the first said purpose I provide the cone or step pulleys 19, 22, whereby the speed of rotation of the shaft 21 with relation to the shaft 16 may be increased or diminished to increase or diminish the rotation of the shaft 24 and the consequent speed of reciprocation of the work-carrier. The relative speed of rotaion of the shaft 39 depends upon the engagement between the pawl 49 and ratchet 48. I control this engagement by providing a plate 88 loosely mounted between its ends on the shaft 39 and having a segmental bearing flange 89. In the lower end portion of the plate 88 is a segmental slot 90 through which extends a clamping-screw 91 entering the standard 25.

Figure 4:
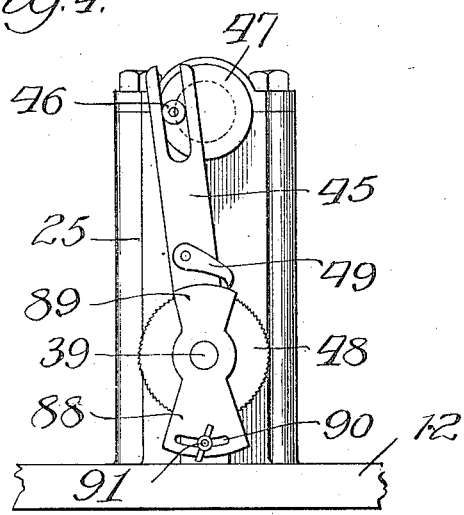
Figure 5:
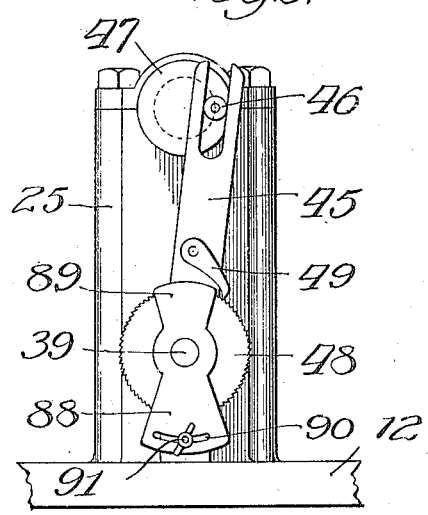
Figure 6:
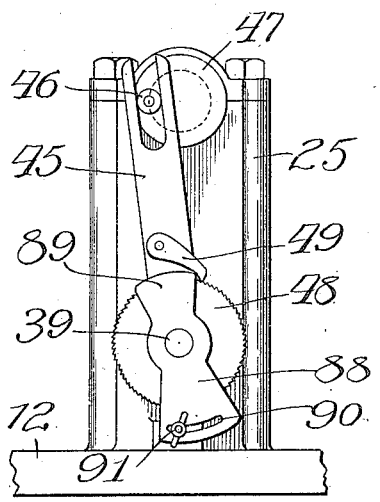
Figure 7:
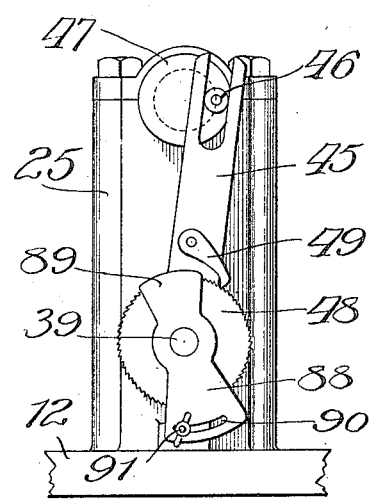

When the plate 88 is swung and fastened in the position indicated in Figs. 4 and 5 the pawl, in the movement of the lever 45 to the left, will ride upon the surface 89 throughout the greater part of its throw and engage a ratchet-tooth only during the final movement of its throw in the opposite direction; while when adjusted to the position shown in Figs. 6 and 7 the pawl will ride only upon the ratchet-teeth and be in engagement with the tooth throughout the entire distance of its throw. It will be seen that by adjusting the plate 88 the ratchet-wheel may be advanced in each throw a distance of one tooth only, or the distance of a number of teeth, and thus the axial movement of the shaft 39 and its cam 42 in each rotation of the shaft 24 may be accurately adjusted. As a part of the means for regulating the length of the steps in the up and down, intermittent movements of the carrier the rod 82 may be adjusted up and down in the slot 86. Thus it will be understood that means are provided for readily increasing or diminishing the extent of reciprocation of the work-carrier and the closeness together of the polishing lines as may be necessary in any particular case.

It is desirable that the polishing lines, or lines of engagement, of the polishing-wheel with the blade being polished, shall extend parallel with the sharp edge of the blade. To accomplish this I provide upon the bar 52 of the rocking-frame 50 a shoe, or face-plate, 92 along which the roller 66 may move during its reciprocation to shape the path of the work-carrier. If the knife-blade, for example, to be polished is straight, like that of an ordinary dinner knife, a flat plate 92 will be provided, while in the case of a curved carving-knife, for example, a plate such as that shown in Fig. 11 will be provided with a working face of approximately the same contour as the cutting edge of the knife. It will be understood, of course, that the weight of the arms 65, 68 and work-carrier, and parts carried thereby, will tend to hold the roller 66 in engagement with the face of the shoe or plate 92 and that the said shoe moves with the rocking-frame 50 in the raising and lowering of the work-carrier with reference to the polishing-wheel.

The spring plungers 69 operate to hold the blade, or the like, which is being glazed, yieldingly against the polishing-wheel. The blade should be held in a position more or less centrally between the two plungers 69, so that the latter will yield equally under pressure exerted against the surface being polished. The right-hand plate or work-carrier 76 shown is adapted for holding a knife-blade while it is being polished on one side. This plate, as before stated, may be readily removed from the carrier-plate 73, and it may be replaced with a left-hand plate 76 adapted to hold a knife-blade in the reverse direction to be polished on the side opposite that previously glazed. In practice the attendant may cause a batch of knife-blades to be polished first on one side, and then, by substituting another plate 76, cause the blades to be polished on their opposite sides. For this purpose he would also reverse the shoe 92 on the bar 52 in the event that the blades are not of the straight type. In substituting one plate 76 for another it may be necessary for the purpose of properly positioning the sweep of the blade to be glazed with reference to the polishing-wheel, to shift the work-carrier to the right or left with reference to the plungers 69. This may be done by loosening the bolts or screws 75 and sliding the work-holder at its lugs 74 along the bar 72 and fastening them again in adjusted position.

The means, such as the cone-pulleys 19, 22, for changing the speed of reciprocation of the work-carrier are important, because, in order to produce the best results, said speed should be regulated in accordance with the throw of the work-carrier, which stroke, as before stated, is regulated to correspond, more or less, exactly with the length of knife-blade, or the like, to be polished. For example, if the work-carrier moves at one speed in its stroke, to produce the best results in polishing a blade of a certain length, it should move one-half that speed in polishing a blade of twice the length; otherwise, in attempting to reciprocate the carrier double the distance in the same time the machine would be over-speeded, with possible disastrous results.

The ratchet-wheel 48 carries a number of teeth capable of producing the desired number of step by step movements of the work-carrier when operating upon a blade or other article of the greatest width for which the machine is adapted. Thus, in glazing a blade of the greatest width the pawl mechanism would be adjusted to turn the ratchet-wheel the distance of one tooth at a time. In operating upon a knife-blade of half that width the pawl mechanism may be adjusted to advance the ratchet-wheel the distance of two teeth with each reciprocation. Thus the narrower the blade to be polished the farther the ratchet-wheel would be moved in each reciprocation of the pawl, and the distance between the polishing lines may be regulated by raising or lowering the position of adjustment of the head 83 in the slot 86 of the rocking-frame 50. In changing the adjustment of the head 83 along the slot 86 it will be necessary to increase or diminish the length of the rod 82, which is done by means of the turn-buckle thereon, so that the path, through which the carrier rocks, may be regulated as desired.

What I claim as new and desire to secure by Letters Patent is—

1. In a machine of the character described, the combination with the abrading-wheel and work-holder, of means for reciprocating the work-holder comprising, in combination, a rotary shaft, an eccentric sliding connection on the shaft operatively engaging a shaft carrying the holder, means for changing the eccentricity of said connection, and means for rotating said shaft.

2. In a machine of the character described, the combination with the abrading-wheel, of a work-holder comprising a shaft and a frame and work-carrier thereon, and means for reciprocating the work-holder comprising a rotary shaft, a vertically-disposed guide-bar on said shaft, a sliding block on the said bar eccentrically connected with said shaft, and means for rotating said shaft.

3. In a machine of the character described, the combination with the abrading-wheel, of a work-holder comprising a shaft and a frame and a work-carrier thereon, means for reciprocating the work-holder comprising a rotary shaft, a vertically-disposed guide-bar on said shaft, a sliding block on the said bar eccentrically connected with the said shaft, means for varying the eccentricity of said block to increase or diminish the stroke of the work-holder, and means for rotating said shaft.

4. In a machine of the character described, the combination with the abrading-wheel, of a work-holder comprising a rocking-frame, a rock-shaft journaled in said frame, means for reciprocating the rock-shaft in the frame, a work-holder frame fastened to said rock-shaft and sliding against said rocking-frame, and means for rocking said first-named rocking frame.

5. In a machine of the character described, the combination with the abrading-wheel and workholder comprising a rocking-frame, a rock-shaft journaled in said frame, means for reciprocating the rock-shaft in the frame, a workholder-frame fastened to said rock-shaft and sliding against said rocking-frame and means for rocking said rocking-frame comprising a shaft, means for intermittently rotating said shaft, a cam on said shaft having its cam surface on a lateral face thereof, and lever mechanism connected with the workholder and engaging said cam surface, for the purpose set forth.

6. In a machine of the character described, the combination with the abrading-wheel and work-holder, of means for causing a step-by-step rocking movement of the workholder, comprising a drive-shaft, a driven shaft, a cam on said driven shaft, lever mechanism connected with said holder and actuated by said cam, a ratchet-wheel on said driven shaft, an eccentric pin at the end of said drive-shaft, a lever pivoted on said driven shaft and provided with an elongated slot engaged by said pin, and a depending pawl on said lever engaging said ratchet, substantially as and for the purpose set forth.

7. In a machine of the character described, the combination with the abrading-wheel, work-holder, and means for rocking and reciprocating said work-holder, of means for adjusting and regulating the step-by-step rocking movement of the work-holder, comprising a drive-shaft, a driven shaft, a cam on said driven shaft, lever-mechanism connected with said holder and actuated by said cam, a ratchet-wheel on said driven shaft, a reciprocating pawl actuated by said drive-shaft to engage said ratchet-wheel, and a plate on said ratchet-wheel adjustable along the path of said pawl to limit the increase or throw of the pawl while in engagement with the ratchet-wheel.

8. In a machine of the character described, the combination with the abrading-wheel, of a stirrup-frame, a rock-shaft journaled in said frame to reciprocate therein, means for reciprocating the rock-shaft in the said frame, a work-holder having a depending arm movable along the lower bar of said stirrup frame, and means for rocking the said frame by intermittent movements to produce a step-by-step rocking movement of the work-holder, for the purpose set forth.

9. In a machine of the character described, the combination with the abrading-wheel, of a workholder comprising a rocking-frame, a rock-shaft journaled in said frame, means for reciprocating the rock-shaft in the frame, a guide on said rocking-frame having a guide surface conforming to the shape of the article to be operated upon, a workholder-frame fastened to said rock-shaft and sliding against said guide, and means for rocking said first-named rocking-frame, for the purpose set forth.

10. In a machine of the character described, the combination with the abrading-wheel, of a work-holder frame, plungers mounted upon opposite end-portions of said frame, each of said plungers being provided with a spring for sustaining each plunger independently of the other yieldingly on the frame, a work-holder secured toward opposite ends respectively to the said plungers, and means for reciprocating and rocking said work-holder frame.

11. In a machine of the character described, the combination with the abrading-wheel, of a work-holder frame, plungers mounted upon opposite end-portions of said frame and each of said plungers being provided with a spring for sustaining each plunger independently of the other yieldingly on the frame, means for regulating the tension of each spring, a work-holder secured toward opposite ends respectively to the said plungers, and means for reciprocating and rocking said work-holder frame.

12. In a machine of the character described, the combination with the abrading-wheel of a work-holder, a drive-shaft, means operatively connecting together said drive-shaft and work-holder for reciprocating the latter, means for driving said shaft, fast and loose pulleys on said drive-shaft, a driven shaft belted to said pulleys, a spring-actuated belt-shifting rod, a starting lever movable to engage and shift said rod against the resistance of its spring, and means actuated by the driven shaft for releasing said rod so that it will be returned by its spring and shift the belt to the loose pulley, when the driven shaft completes one revolution.

13. In a machine of the character described, the combination with the abrading-wheel, of a work-holder, means for reciprocating said holder, a drive-shaft, fast and loose pulleys on said shaft, a driven shaft belted to said pulleys, a spring-returned belt-shifting rod, a starting lever movable to engage and shift said rod against the resistance of its spring to shift the belt to the fast pulley, a bell-crank lever fulcrumed on said shifting rod and provided at one end with a catch, a stationary pin in the path of movement of said catch to engage the same when the belt is shifted to the fast pulley, means actuated by said driven shaft for rocking the work-carrier, and a lug operatively mounted upon the driven shaft into the path of which an arm of the bell-crank lever extends while the catch is in its pin-engaging position, whereby as the driven shaft nears the completion of one revolution the lug engages the bell-crank lever to release the catch and permit the belt-shifting bar to be returned by its spring and shift the belt to the loose pulley, substantially as and for the purpose set forth.

14. In a machine of the character described, the combination with the abrading-wheel, work-holder, comprising a rocking-frame, a rock-shaft journaled in said frame, means for reciprocating the rock-shaft in the frame, a workholder-frame fastened to said rock-shaft and sliding against said rocking frame, of means for giving a step-by-step rocking movement to said work-holder, comprising a cam-actuated lever mechanism operatively and adjustably connected with the first-named rocking-frame, and means for changing the adjustment of said lever mechanism with reference to the work-holder, for the purpose set forth.

15. In a machine of the character described, the combination with the abrading-wheel, of a work-holder, means for reciprocating said holder, a rocking-frame, a rocking guide-frame along which the said holder reciprocates, and means for giving a step-by-step rocking movement to the holder comprising an intermittently rotating cam, a lever at one end engaging said cam to be reciprocated thereby, a rod connected at one end to said lever and at its opposite end to said rocking guide-frame, means for changing the adjustment between the said rod and frame, and means for lengthening and shortening the distance between said lever and frame, for the purpose set forth.

JOHN G. BLESSING.

In presence of—
W. B. DAVIES,
C. W. WASHBURNE.